United States Patent [19]

Johnson, Jr. et al.

[11] 4,344,225

[45] Aug. 17, 1982

[54] PRE-ASSEMBLY AND TERMINATING APPARATUS

[75] Inventors: Keith Johnson, Jr., Manheim; Robert A. Long, Harrisburg, both of Pa.

[73] Assignee: AMP Incorporated, Harrisburg, Pa.

[21] Appl. No.: 124,661

[22] Filed: Feb. 25, 1980

[51] Int. Cl.³ ........................ H01R 43/00; B23P 19/00

[52] U.S. Cl. ........................................ 29/857; 29/783; 29/795; 29/33 M; 29/564.1; 29/749

[58] Field of Search ........... 29/33 M, 749, 753, 564.1, 29/742, 747, 711, 755, 757, 759, 761, 760, 857

[56] References Cited

U.S. PATENT DOCUMENTS 3,820,055 6/1974 Huffnagle .
4,020,540 5/1977 Casciotti .
4,110,880 9/1978 Peppler et al. .
4,148,130 4/1979 Stauffer et al. .
4,281,442 8/1981 Senior et al. ....................... 29/33 M

*Primary Examiner*—Francis S. Husar
*Assistant Examiner*—Carl J. Arbes
*Attorney, Agent, or Firm*—Russell J. Egan

[57] ABSTRACT

An apparatus is disclosed for pre-assembling a connector housing, which is pre-loaded with a plurality of terminals, with a respective connector cover and subsequently applying the pre-assembled connector to terminate a multi-conductor flat cable. The pre-loaded connector housings and the covers are separately fed to the apparatus by magazines. Each cover is positioned with respect to a housing and applied thereto with the assembly thereafter being rotated and moved to a termination station where a multi-conductor flat cable is terminated by the connector. The feed arrangement assures that only a single cover and connector will be fed from the respective magazines for each pre-assembly operation thereby obviating the possibility of jamming.

9 Claims, 16 Drawing Figures

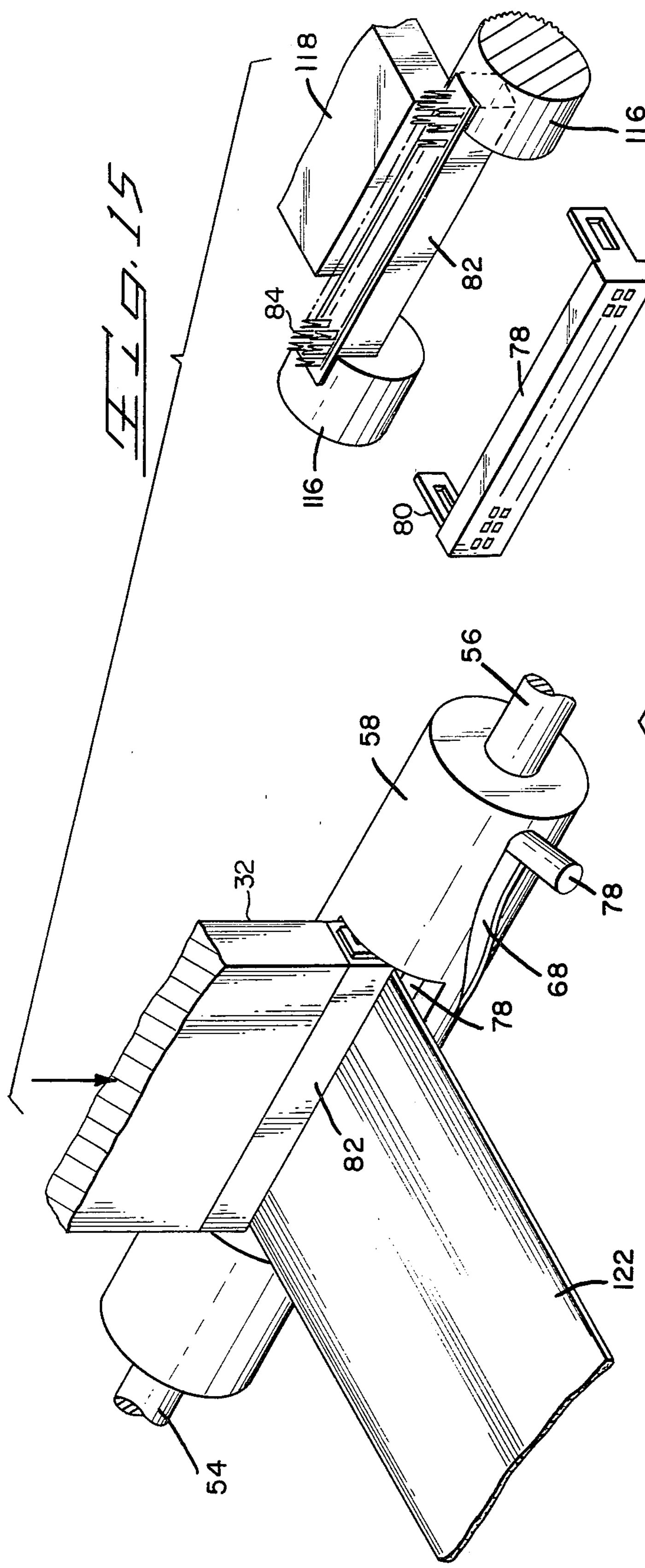
118
116
84
82
116
32
58
56
78
68
78
82
122
54
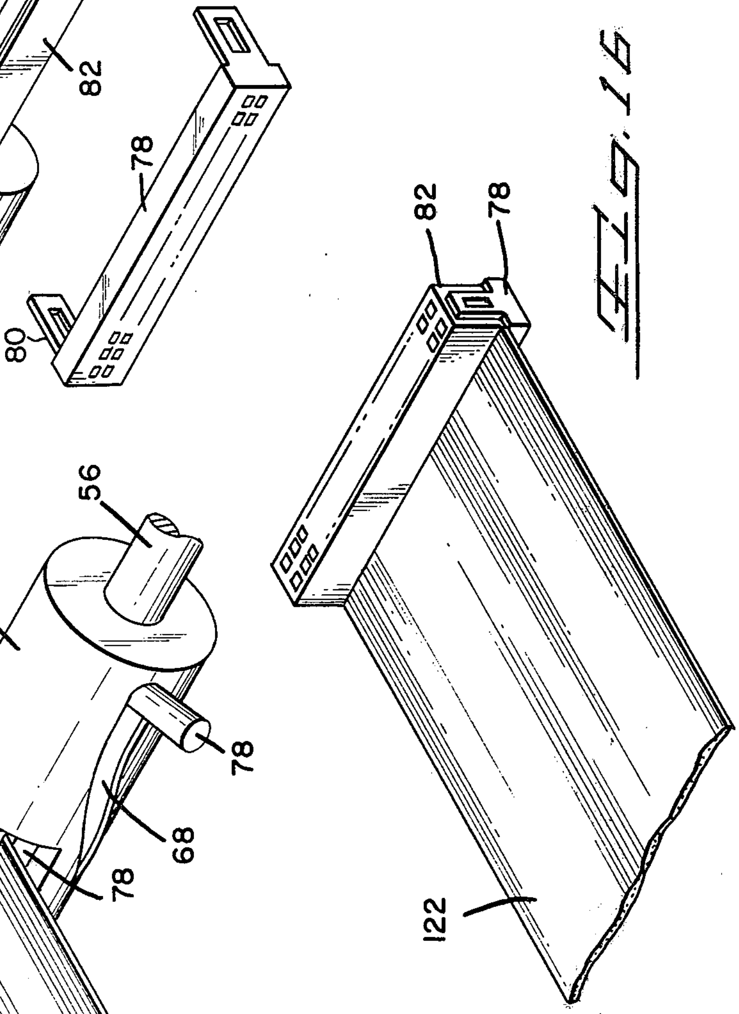
78
78
80
82
78
122

PRE-ASSEMBLY AND TERMINATING APPARATUS

BACKGROUND OF THE INVENTION

1. The Field of the Invention

The present invention relates to an apparatus for pre-assembling a pre-loaded connector and cover and terminating a multi-conductor flat flexible cable with the connector.

2. The Prior Art

The present invention is concerned with the pre-assembly and application of multi-terminal connectors to multi-conductor flat cable. The connectors of the type used in the present invention are of the type generally disclosed in U.S. Pat. No. 3,820,055. Each connector comprises a housing having a plurality of through passages extending between a cable receiving face and a mating face with a like plurality of terminals each mounted in a respective passage with a mating portion directed towards the mating face and an insulation piercing portion, formed by a pair of tines defining a slot therebetween, projecting from the cable receiving face. A cover applied to the connector housing encloses the cable and the terminals at the termination point. The terminals also include a latching portion, at the free end of each tine, which engages the cover to secure it to the connector housing across the entire width thereof.

In the past the connectors of the above described type have been applied in a two step assembly with the connector first being applied to the cable and then, in a separate independent step, the cover being applied to the connector and simultaneously being latched thereto. Examples of such apparatus for making such a two step application can be found in U.S. Pat. No. 4,148,130. The present invention intends to obviate many of the difficulties accompanying the above described methods by providing a machine which will pre-assemble a cover with a pre-loaded connector housing and then terminate a cable with the connector in a single step.

SUMMARY OF THE INVENTION

The present invention concerns an assembly and terminating apparatus which receives a supply of connector housings, pre-loaded with terminals, from a first magazine and a supply of covers from a second magazine and pre-assembles a cover on each connector housing then transports and positions the pre-assembled connector in a terminating station so that the completed connector is applied to a multi-conductor flat cable in a single terminating step. The magazine dispensing means includes assurance that only a single connector housing or cover will be dispensed by grasping the next lower most unit in each magazine and elevating the entire magazine with its contents prior to feeding of the connector housing and cover to the pre-assembly station. The pre-assembled cover and connector housing are rotated as they are transported to be properly positioned upon arrival at the terminating station. A cable fed to the pre-assembled connector is then terminated in a single operation which applies the connector to the cable and the cover fully to the connector housing.

It is therefore an object of the present invention to produce an assembly apparatus which pre-assembles pre-loaded connector housings with respective covers and transports the pre-loaded, pre-assembled connector to a terminating station where a cable is fully terminated and the cover fully applied in a single operation.

It is another object of the present invention to produce an apparatus which assures positive feed of a single unit from a magazine.

It is a further object of the present invention to produce a pre-assembly and terminating apparatus which can be readily and economically manufactured.

The means for accomplishing the foregoing objects and other advantages of the present invention will become apparent to those skilled in the art from the following detailed description taken with reference to the accompanying drawings.

BRIEF DESCRIPTION OF THE DRAWINGS

FIG. 15 is a diagrammatic view similar to FIG. 14 showing termination of a multi-conductor flat cable by a pre-assembled connector; and FIG. 16 is a perspective view of a fully terminated multi-conductor flat cable.

DETAILED DESCRIPTION OF THE PREFERRED EMBODIMENT

The subject apparatus 10 is intended for pre-assembly of covers with pre-loaded connector housings and the application of the pre-assembled connector to a multi-conductor flat flexible cable, also known as ribbon cable. The subject apparatus is used in conjunction with a know arbor press 12 having a vertically actuated ram 14 mounted therein. The press is of conventional configuration and is preferably pneumatically driven. Since the press 12 is known, no details of its structure or operation will be given as it does not form a real part of the present invention. In the following description, the directions left and right will be the same as for an operator facing the subject apparatus in FIG. 1.

Figure 1:
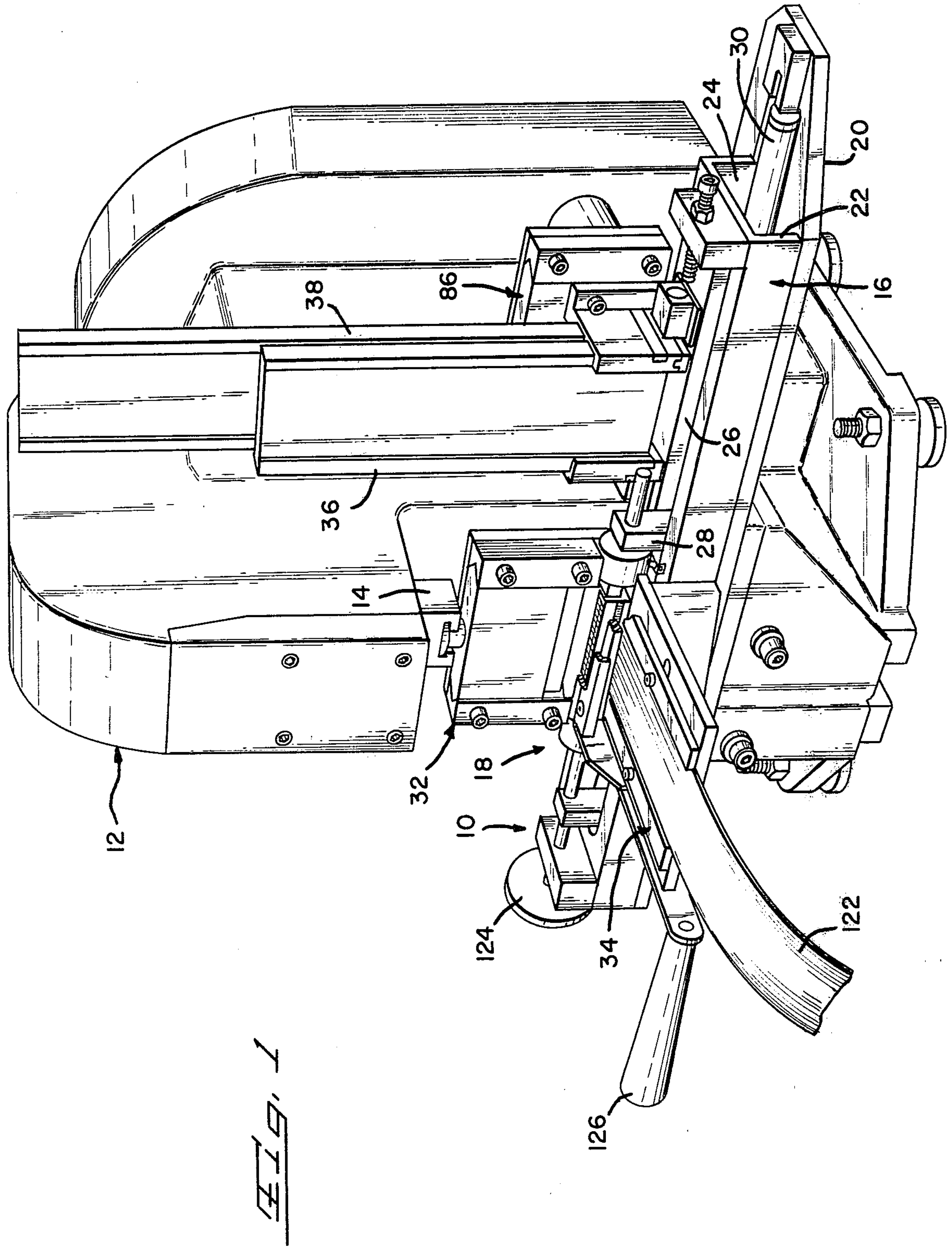
FIG. 1 is a perspective view of an apparatus according to the present invention.
Figure 2:
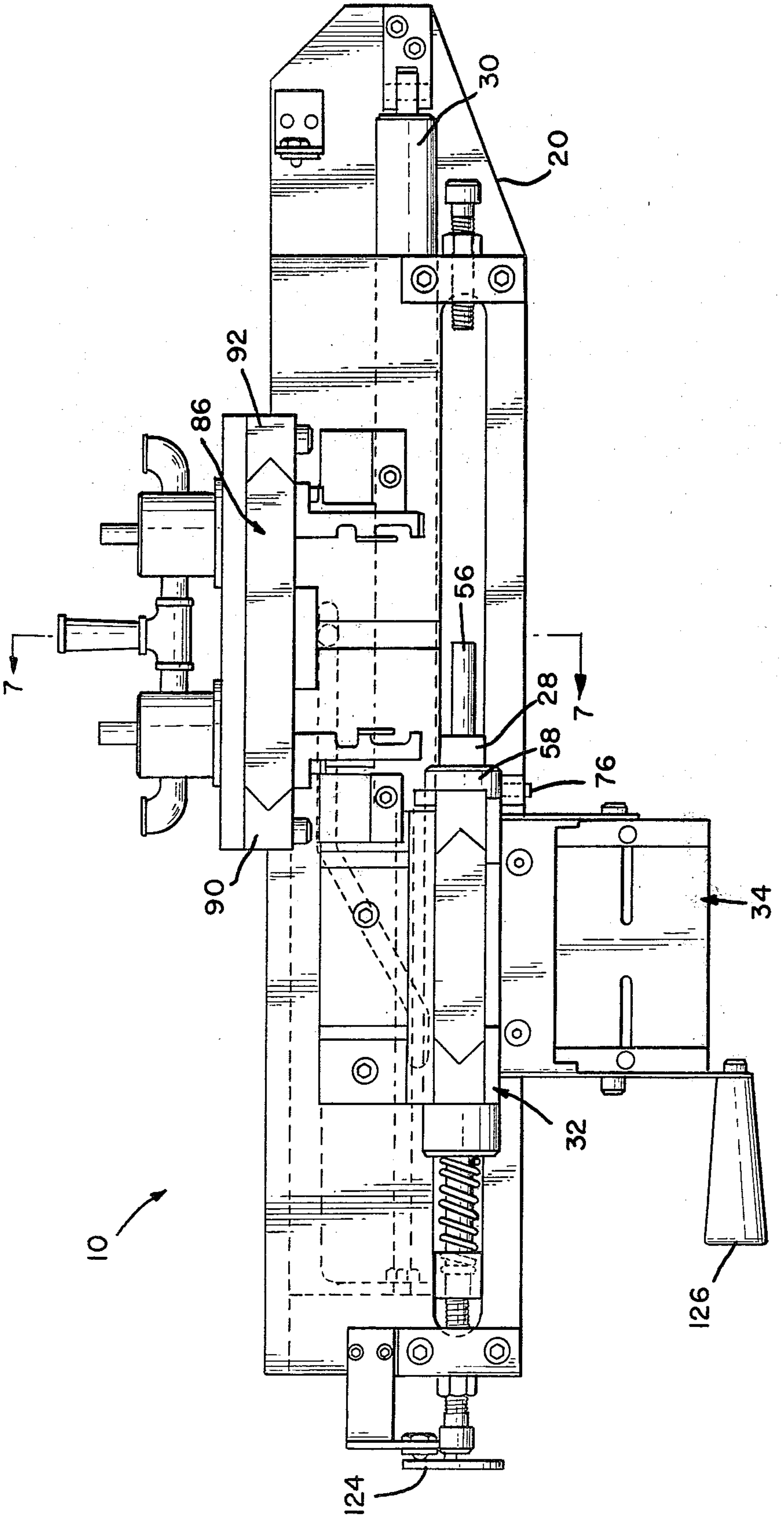
FIG. 2 is a top plan view of the apparatus according to the present invention.

The subject apparatus 10 is an elongated unit including a feed and pre-assembly station 16 and a terminating station 18. The assembly includes a generally rectangular mounting or base plate 20 and an inverted channel-shaped cover 22 secured thereto defining an elongated chamber 24. A slot 26 extends the length of the top side of the cover 22 and opens into chamber 24. A transfer assembly 28 is slidably mounted in the chamber 24 and has a portion which extends through the slot 26. The transfer assembly 28 is shown in detail in FIG. 9 and will be discussed in detail below. A piston assembly 30 has one end fixed to the plate 20 and extends into the chamber 24 where its opposite free end (not shown) is attached to the transfer assembly 28 to effect the movement thereof. The terminating station 18 includes a vertically acting terminating means 32 and cable feed and guide means 34 which likewise will be discussed in detail below. FIG. 1 contains the only full views of the cover transporting magazine 36 and the housing transporting magazine 38.

Figure 6:
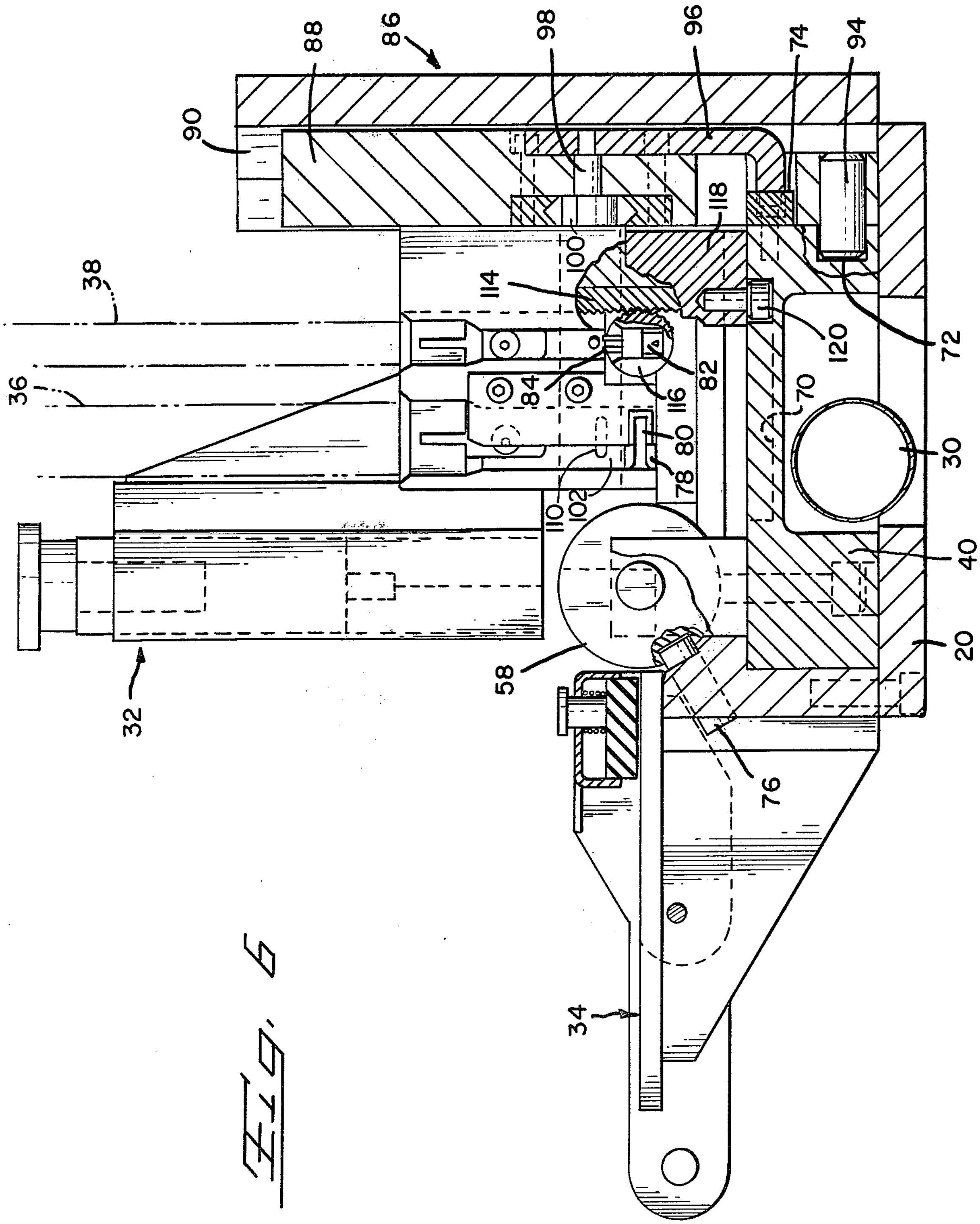
FIG. 6 is a vertical transverse section taken along line 6—6 of FIG. 3.
Figure 9:
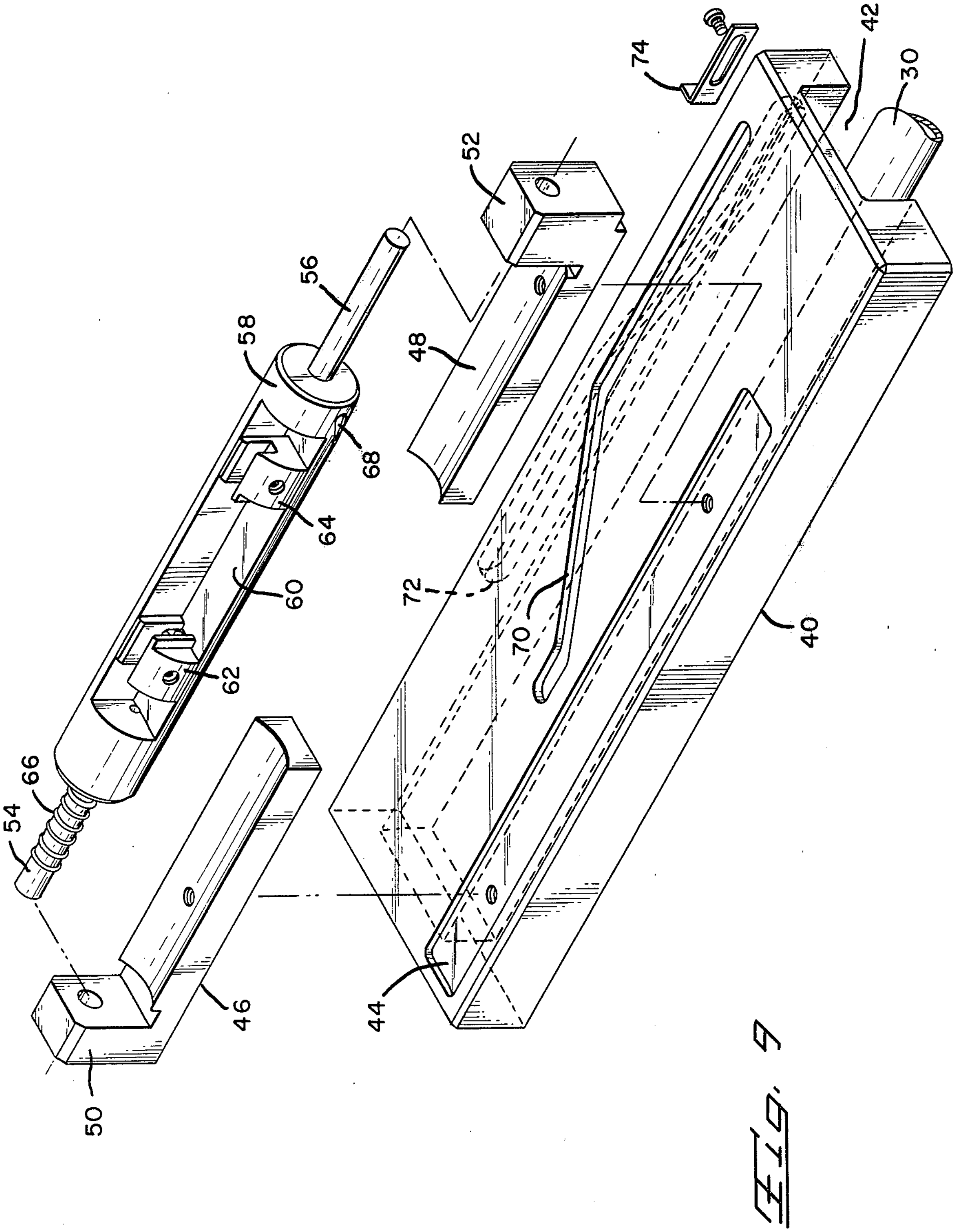
FIG. 9 is an exploded perspective view of the transfer assembly according to the present invention.
Figure 10:
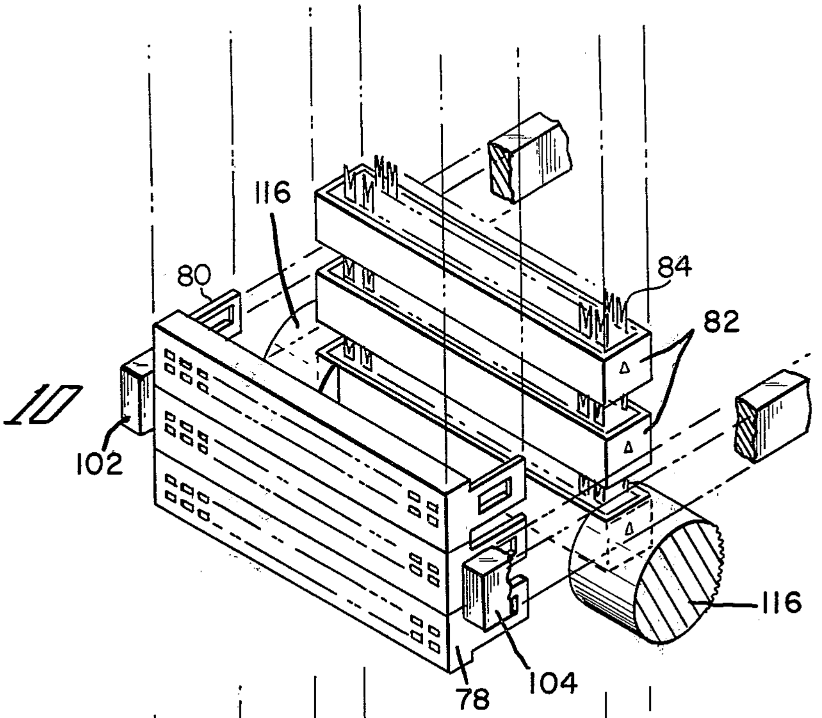
FIG. 10 is a diagrammatic view of the subject invention showing the initial loading of a connector housing and cover.

The transfer assembly 28 is shown in detail in FIG. 9 and includes a generally rectangular cam plate 40 having an outer profile mating with the chamber 24 and a downwardly directed cavity 42 into which the piston assembly 30 extends. The free end of the piston assembly (not shown) is attached to the plate 40 inside the cavity 42 by conventional means (not shown). The plate 40 has a profiled recess 44 in an upper surface in which T bar supports 46, 48 are mounted. Each T bar support has a mounting portion with an upstanding bearing portion 50, 52 at one end which receives the pivot pins 54, 56 of the transfer bar 58. The transfer bar 58 is generally cylindrical with a wedge shaped connector receptacle 60 extending along at least part of the length thereof. A pair of connector holders 62, 64 are adjustably secured in the receptacle 60. An override spring 66 is mounted on pivot pin 54. The transfer assembly 28 includes a number of cam tracks. The first cam track is a helically shaped rotational cam groove 68 which is formed on the outer surface of the transfer bar 58. The second track is a ram cam track 70 formed in the upper surface of the cam plate 40. An escapement lift track 72 is formed on the vertical rear surface of the cam plate 40. The transfer assembly 28 also includes a clamp arm cam lever 74 which is adjustably secured to one end of the rear surface of the cam plate 40. Rotation of the transfer bar 58 is caused by engagement of the rotational cam track 68 with the fixed pin 76, which is best seen in FIG. 6.

Figure 3:
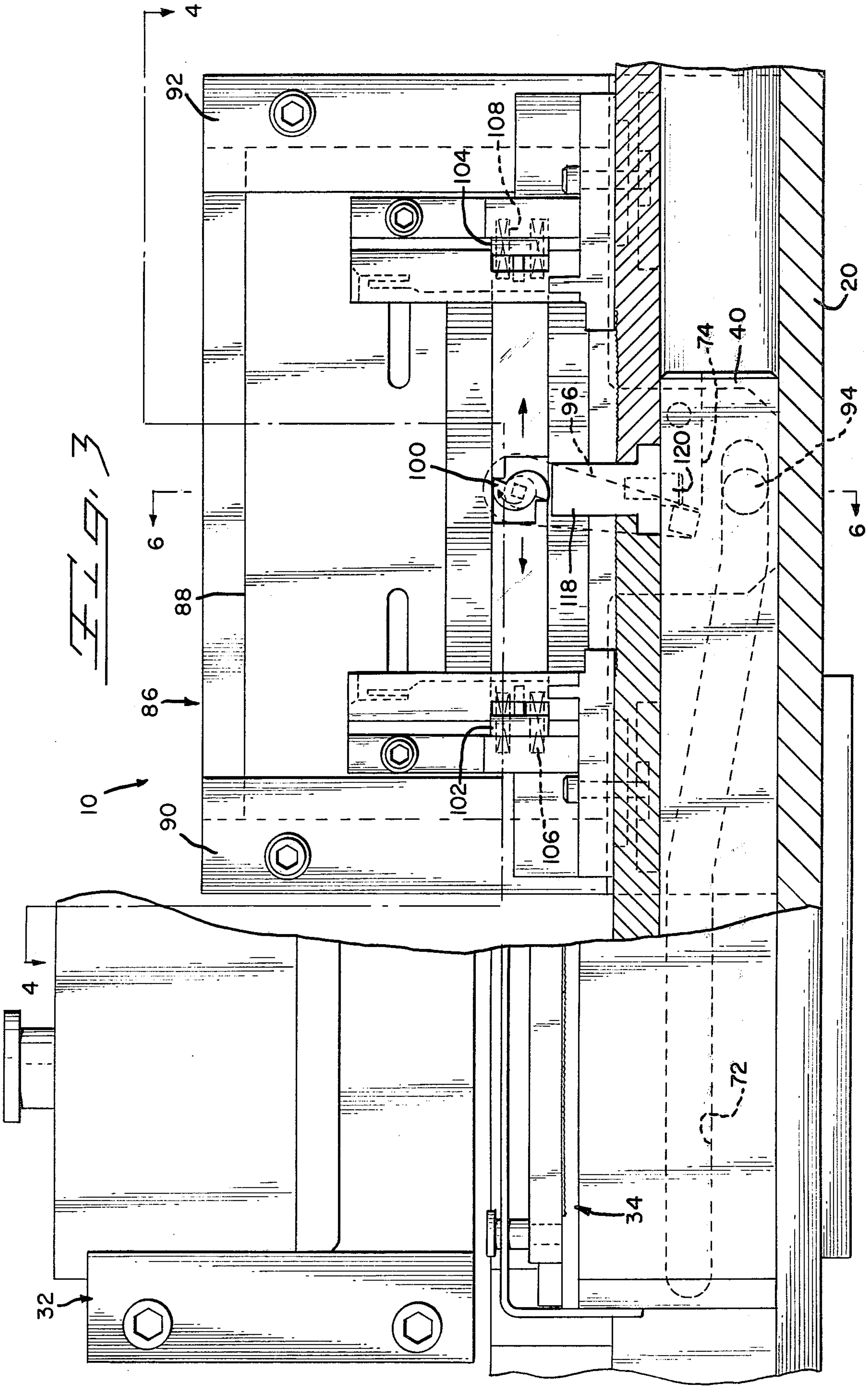
FIG. 3 is a foreshortened front elevation, partially in section, showing the pre-assembly portion of the present invention in an open or loading condition.
Figure 4:
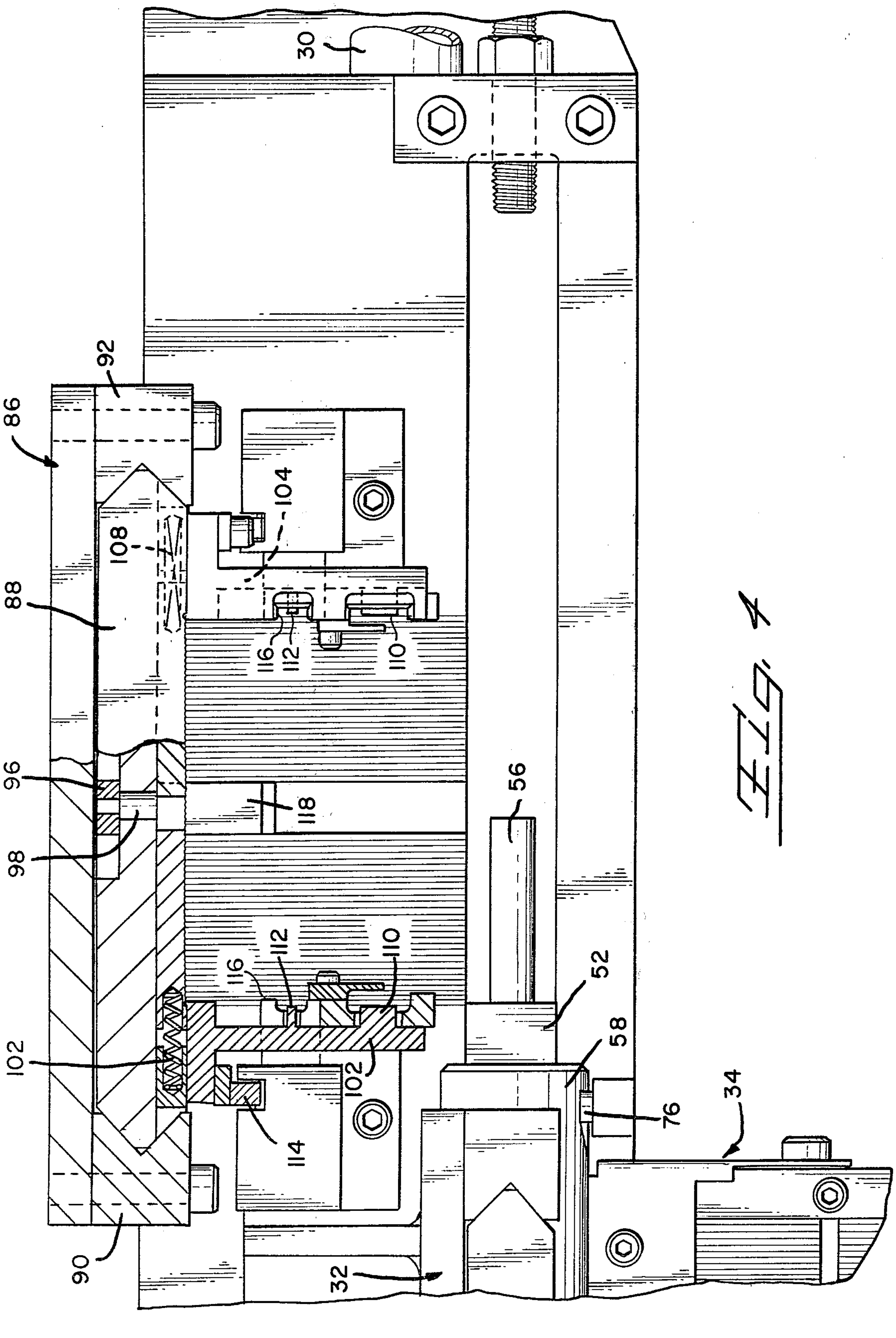
FIG. 4 is a top plan, partially in section taken along line 4—4 of FIG. 3, of the pre-assembly portion of the apparatus according to the present invention.

The pre-assembly station 16 will be described with reference to FIGS. 3 to 6. The magazines 36, 38 have been omitted from these Figures for sake of clarity. However, it should be noted from FIG. 6 that the cover magazine 36 feeds the covers 78 in a horizontal position (the latching arms 80 extending horizontally from the cover) while the housing magazine 38 feeds the connector housings 82 in a vertical position (the terminals 84 being upwardly directed). The lower ends of the magazines are received in slide assembly 86 which includes a slider 88 mounted between vertical guide rails 90, 92. The slider 88 is arranged for vertical motion by the fixed cam pin 94 which rides in the escapement lift track 72 in cam plate 40. The slider 88 also carries a clamp arm cam lever 96 which is mounted for rotary motion by and with a cam pin 98 when its lower end is struck by the clamp arm cam lever 74 carried by cam plate 40. The cam pin 98 has lobes 100 arranged to impart lateral motion to the clamp arms 102, 104 which are spring loaded by springs 106, 108, respectively, to a normally closed or clamped position. In FIG. 3 the clamp arms 102, 104 are shown in their open or released position and in FIG. 5 clamp arms 102, 104 are shown in their closed or clamped position. Each clamp arm 102, 104 has a pair of inwardly directed lugs 110, 112 (FIG. 4) which extend into the respective magazines 36, 38 to engage and secure the next-to-lower-most unit carried therein. A rack 114 is carried by the slider 88 and engages the rollover members 116 which initially receive the connector housings as shown in FIG. 6.

The pre-assembly station is completed by pusher ram 118 having a cam pin 120 depending therefrom and sliding in ram cam track 70 of plate 40.

Figure 5:
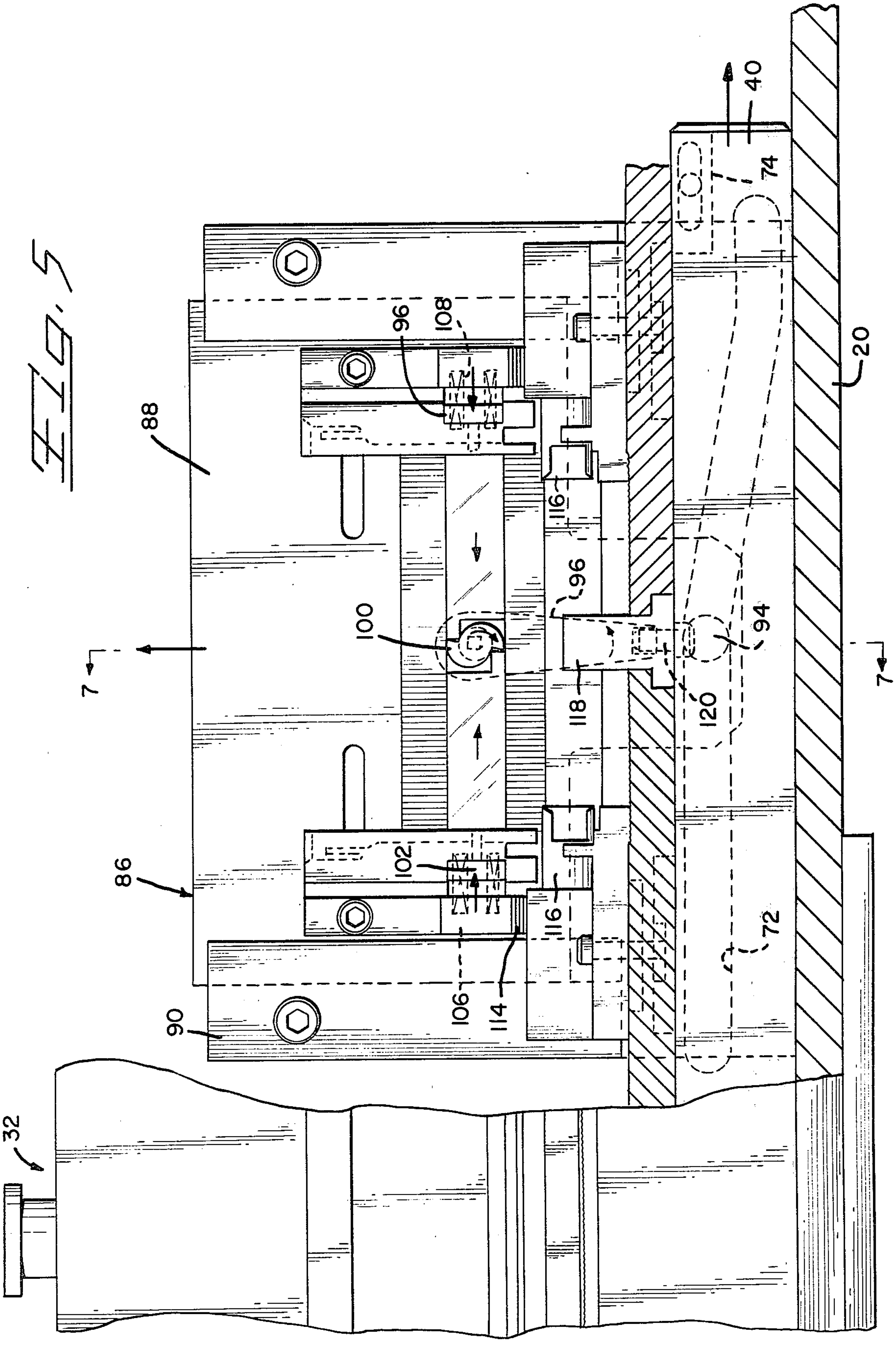
FIG. 5 is a foreshortened front elevation, partially in section, showing the pre-assembly portion of the present invention in a closed or clamped condition.
Figure 7:
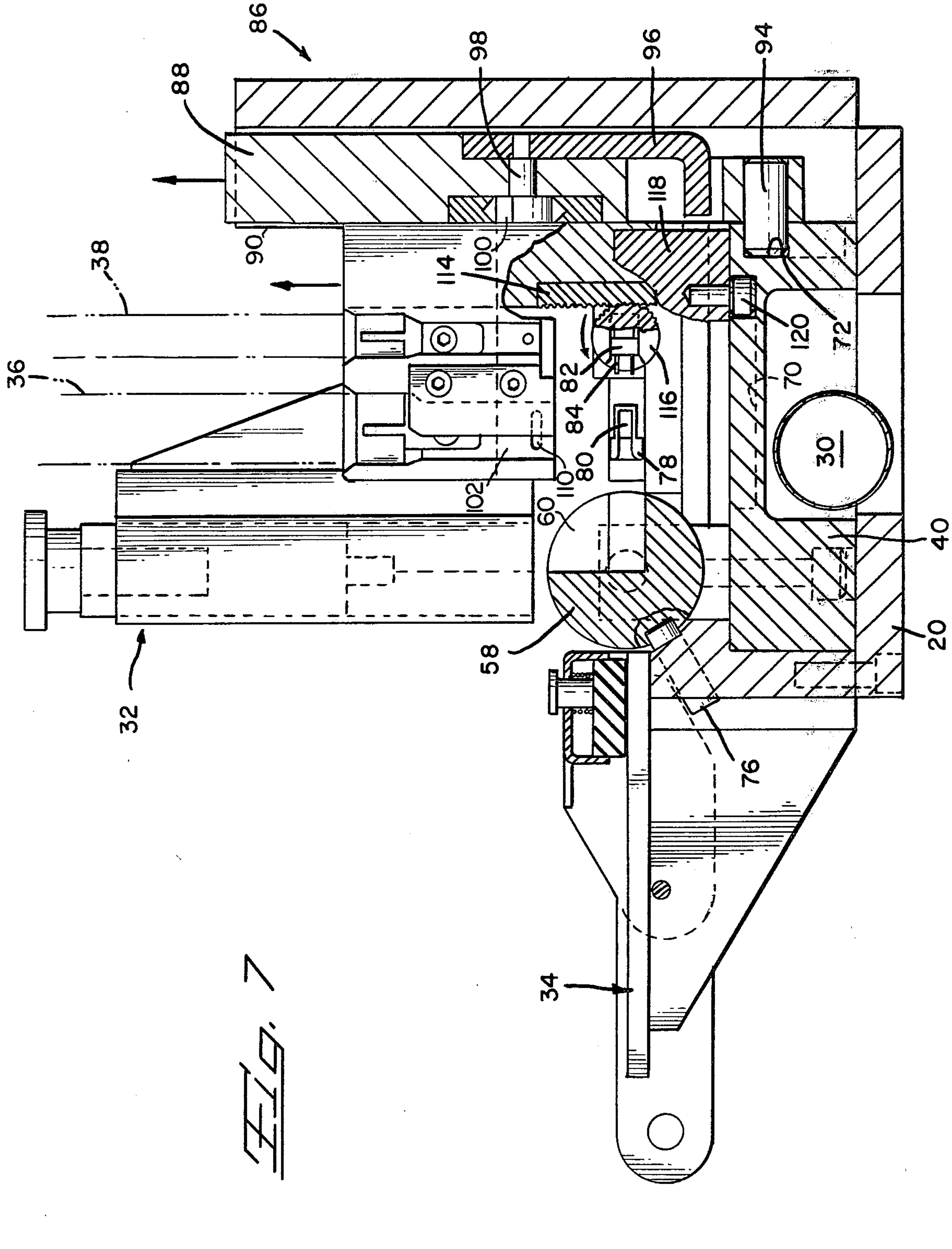
FIG. 7 is a vertical transverse section taken along line 7—7 of FIG. 5.
Figure 11:
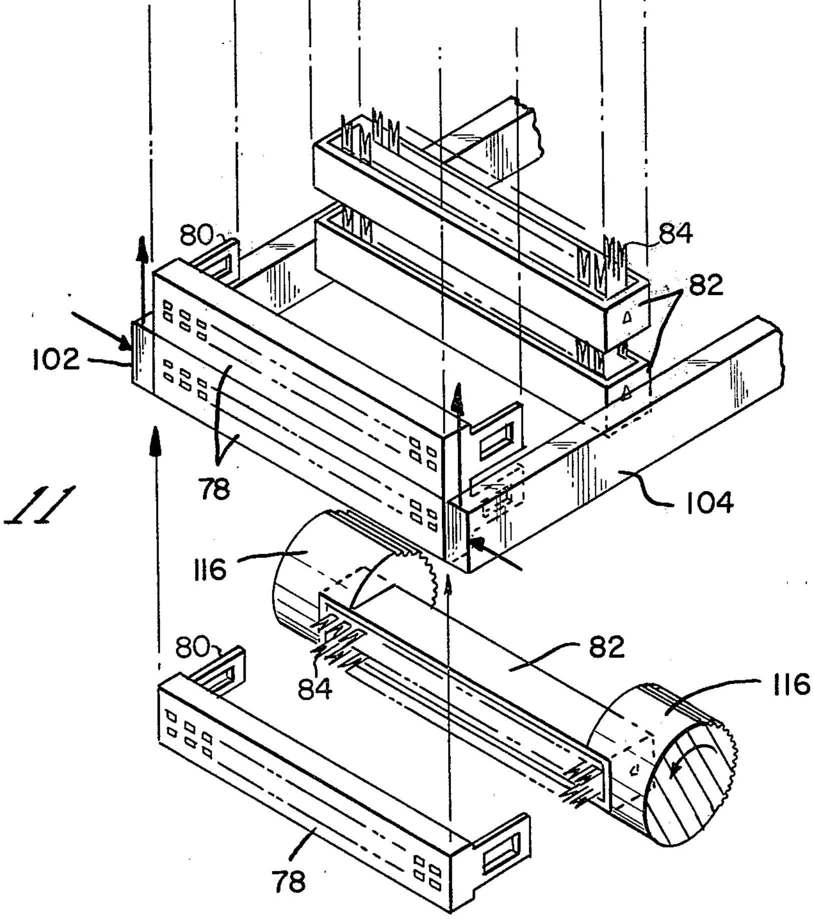
FIG. 11 is a diagrammatic view of the subject invention after rollover of the connector housing and lifting of the magazines.
Figure 12:
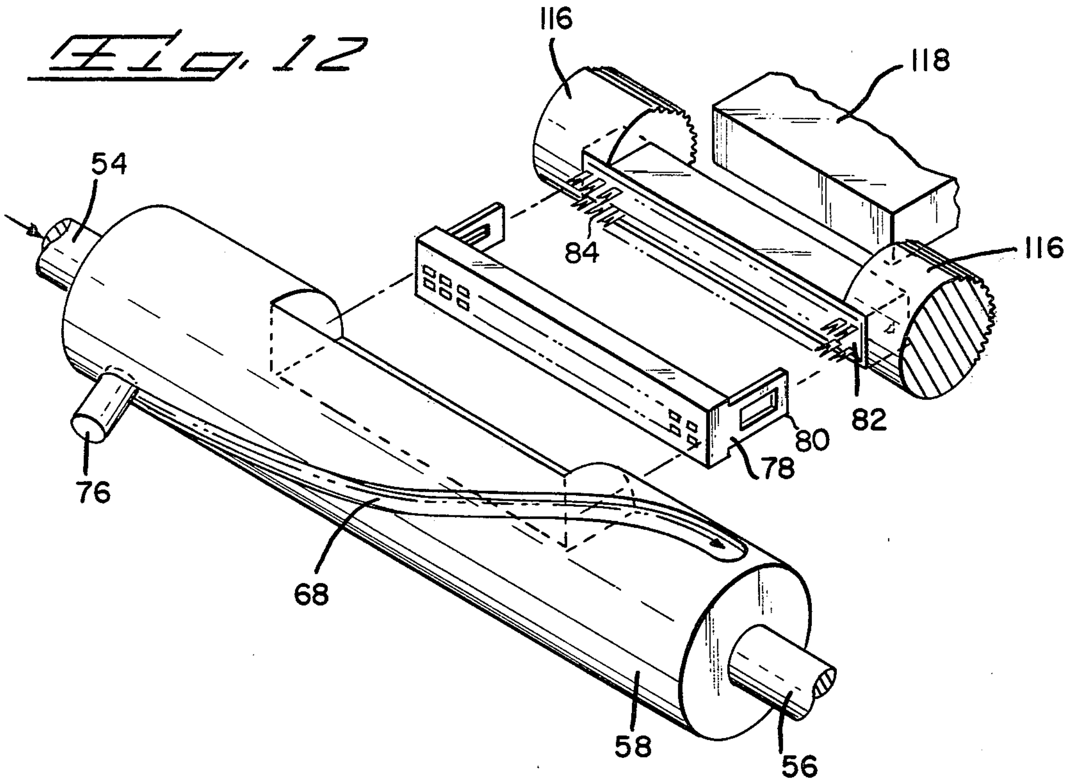
FIG. 12 is a diagrammatic view of the subject invention immediately before pre-assembly of the cover and connector housing and movement into a transfer bar.
Figure 13:
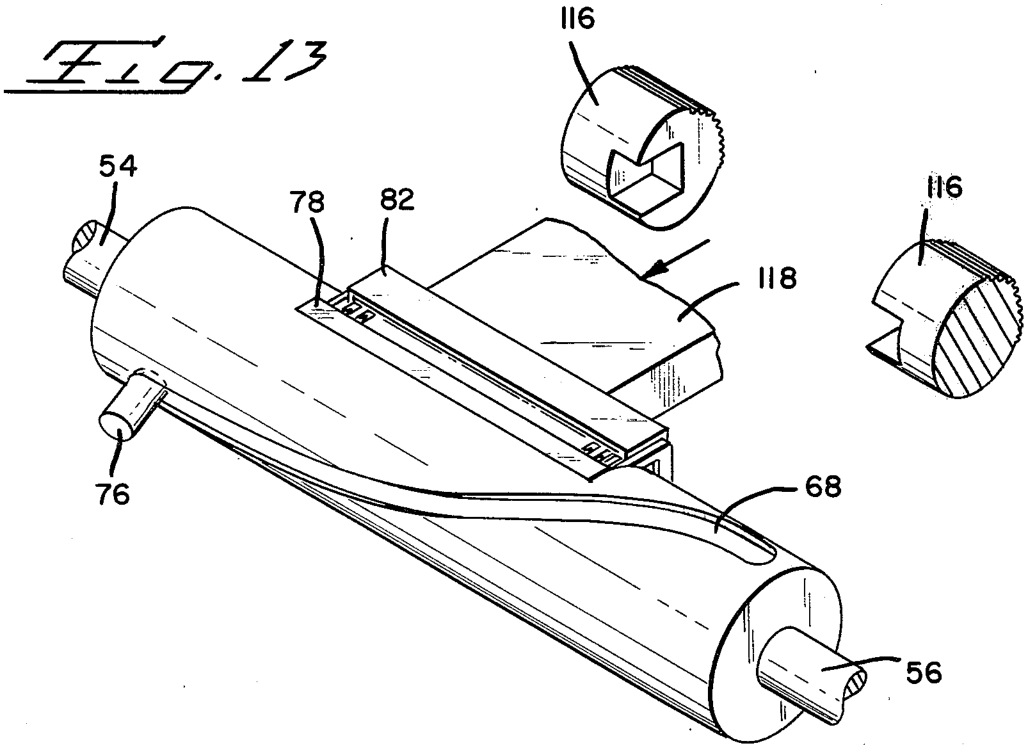
FIG. 13 is a diagrammatic view of the subject invention after pre-assembly and loading of the pre-assembled connector into the transfer bar.
Figure 14:
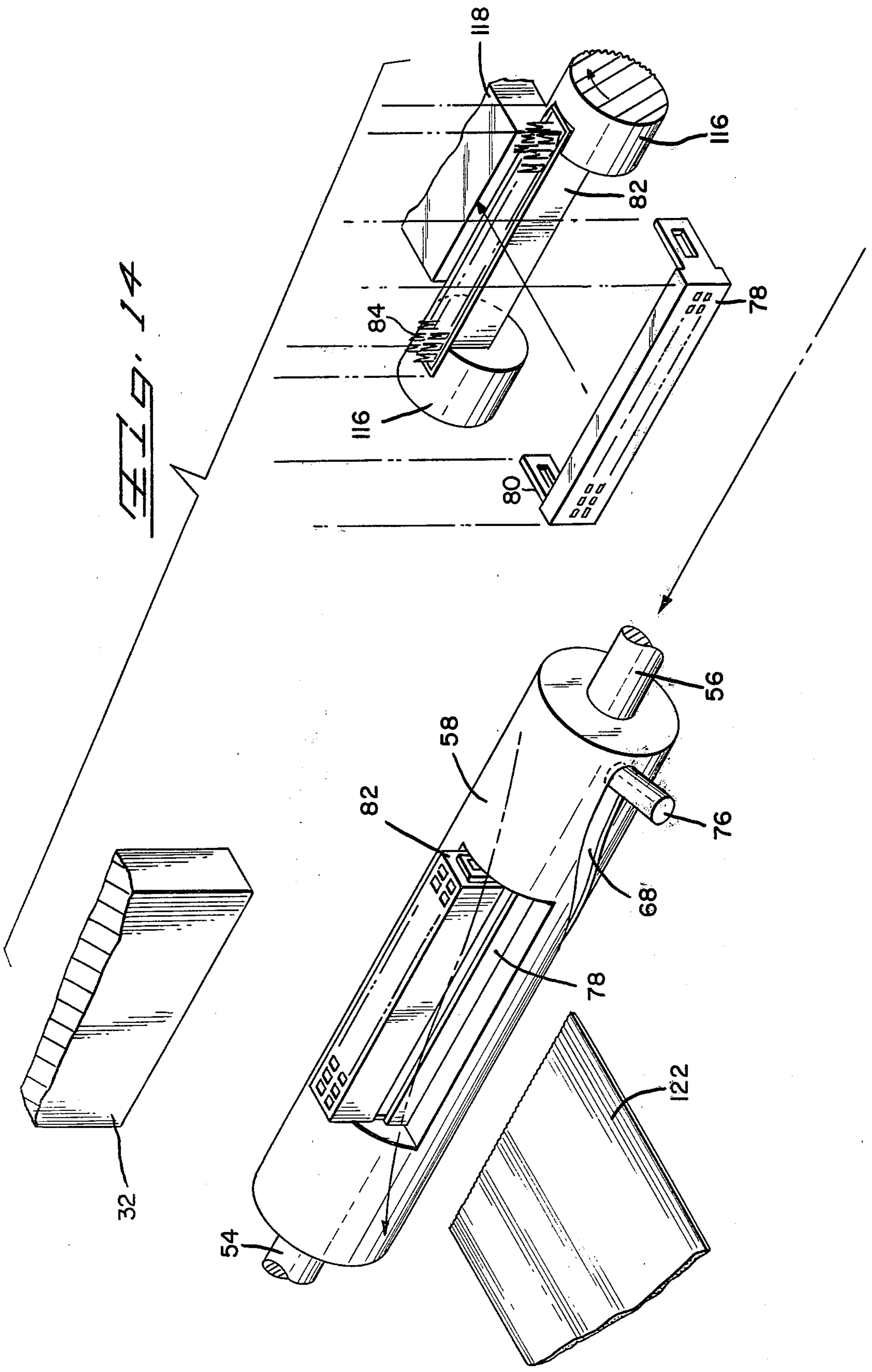
FIG. 14 is a diagrammatic view of the subject invention showing movement of the transfer bar to the terminating station together with loading of the next sequential cover and connector housing.

The operation of the subject apparatus will be described with reference to all of the drawings with the sequence being most easily seen from the schematic representations of FIGS. 10-16. The sequence starts after a termination step (FIG. 1) as piston assembly 30 draws the transfer assembly 28 to the right. The covers 78 and connector housings 82 are fed by gravity from the respective magazines 36, 38 to the pre-assembly station 16. The clamp arm cam lever 74 holds clamp arm 96 in the position shown in FIG. 3 to hold the clamp arms 102, 104 open. The connector housing 82 is positioned to be vertically received in the rollover members 116 (FIGS. 6 and 10) when pusher ram 118 is withdrawn to the position of FIG. 6 by cam pin 120 following track 70. When clamp arm cam lever 74 releases clamp arm cam lever 96 (FIG. 5), the clamping arms 102, 104 close, under the influence of springs 106, 108, with lugs 110, 112 (FIG. 4) engaging the next-to-bottom cover 78 and connector housing 82. Continued rightward movement of transfer assembly 28 draws the transfer bar 58 to the right while rotating it, by pin 76 engaging in groove 68, to the position shown in FIG. 7. The clamped cover and housing and their respective magazines are vertically raised by slider 88 through pin 94 riding in cam track 72, (compare FIGS. 6 and 7) to lift and separate the magazines from the bottom-most cover and connector housing which are to be assembled (FIGS. 5, 7 and 11). This movement is shown in FIG. 11 in exaggerated form. Simultaneously, with this lifting movement, the rack 114 causes the rollover of the connector housing 82 in roll over member 116 so that the terminals 84 are directed toward the cover 78 (FIGS. 7 and 11). The pusher ram 118 is actuated by cam pin 120 riding in ram cam track 70 to push the connector housing 82 from the rollover members 116 into the cover 78 and the transfer bar 58 (FIGS. 8, 12 and 13) effecting the initial preassembly of the cover and connector. When the connector is fully seated in the transfer bar 58 (FIGS. 8 and 13), the transfer bar 58 is driven to the left by piston assembly 30 and the helical cam groove 68 causes the transfer bar 58 to rotate 90° placing the pre-assembled connector in a vertical position beneath the ram 14 of the terminating station 18 (FIGS. 1 and 14). At the same time this movement is occurring, the ram 118 is withdrawn by cam pin 120 riding in ram cam track 70 and the magazines 36, 38 are lowered to dispense the lower-most cover and connector housing (FIG. 14). A cable 122 is then inserted into the space between the cover and the connector housing (FIGS. 14 and 15) with the actuation of the termination means 32 applying the connector to terminate the cable (FIG. 16).

Figure 8:
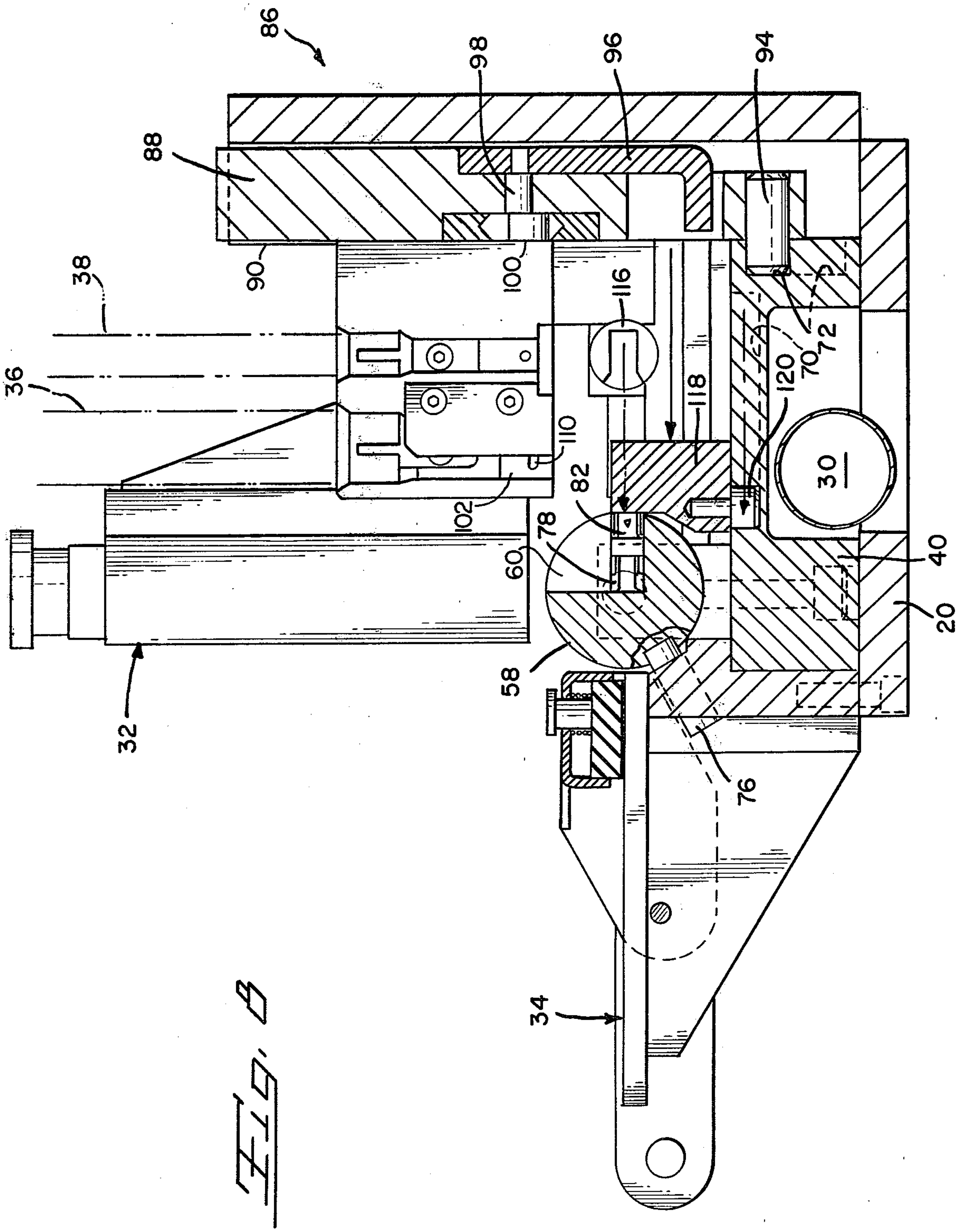
FIG. 8 is a transverse vertical section similar to FIG. 7 showing the apparatus after placement of a pre-assembled connector in the transfer bar.

The magazines containing the covers and housings, respectively, are loaded into the pre-assembly station of the assembly machine as shown in FIG. 1. The lowermost connector and housing will be positioned in the rollover members as shown in FIG. 6. The piston assembly 30 is then actuated with the transfer mechanism being driven to the right, as shown in FIGS. 1 to 5, causing the respective cam pins 94, 120 to ride along the cam tracks 70, 72, respectively, of the cam plate 40 and pin 76 in cam groove 68 transfer bar 58. This will cause the transfer bar to rotate 90° to open to the rear (FIG. 7) enabling it to receive the pre-assembled cover and connector housing. After the rightward movement of the cam plate 40 has commenced, the clamp arm cam lever 74 and clamp arm cam lever 96 cause the clamp arms 102, 104 to close on the next-lower-most cover 78 and connector housing 82 and the movement of the escapement lift cam track 72 will cause the elevation of the slide 88 of the slide assembly 86 simultaneously with the rollover of the connector housing 82 in rollover members 116 so that the terminals 84 face the cover 78 (FIG. 7). The ram 118 is then actuated to drive the connector housing 82 into the cover 78 and into the transfer bar 58 by the ram cam track 70 (FIG. 8). The cam plate 40 then continues a short distance to the right to ensure completion of all of the above movements and then starts a return motion to the left reversing the above sequence of movements. The pre-assembled connector is rotated to a vertical position ready for terminating at the same time the magazines are lowered, the lower-most cover and connector housing released and received in their respective slots, the ram 118 having been withdrawn. When the transfer bar is fully positioned beneath the ram 14 at the terminating station, the press is separately actuated to compress the cover against the housing terminating a cable 122 inserted therebetween.

It should be noted that the subject apparatus is provided with many adjustment means to compensate for various widths of cables and various widths of connectors. To this end several of the component plates are fluted, which is the easiest way to accomplish the adjustment since the cable can simply be laid against the apparatus and the components adjusted to the proper width. This is a substantial savings in time since the operator would not have to count the fine wires or attempt to match components against scales of very small dimensions.

The present invention is preferably pneumatically actuated and to this end pneumatics have been shown associated with the various components. The pneumatic drive means are known and therefore have not been shown or described.

The subject apparatus is provided with several safety devices such as a switch (not shown). This switch assures that the ram 14 of the press 12 will not be actuated unless the transfer assembly 28 is positioned beneath the ram. If the transfer assembly had moved from beneath the ram and the ram were to be actuated, damage to the transfer assembly could result.

A further sensor 124 is provided to determine when there is a connector in the transfer assembly. This sensor prevents movement of a loaded transfer assembly to the pre-assembly station where jamming would occur in attempting to load a second connector into the transfer bar. Another sensor (not shown) is provided in conjunction with handle 126. This is a cable clamp sensor and must be closed before the transfer assembly can move. Thus there is no danger of the transfer assembly being actuated while a terminated cable is being removed from the subject apparatus.

The present invention may be subject to many modifications and changes without departing from the spirit or essential characteristics thereof. The present embodiment is to be considered in all respects as illustrative and not restrictive of the scope of the invention.

What is claimed is:

1. A method of terminating multi-conductor cable comprising the steps of:

dispensing a cover and a housing preloaded with a plurality of terminals in a preassembly station;

preassembling said cover and said housing;

transporting said preassembled cover and housing to a terminating station;

inserting a multi-conductor cable into said preassembled cover and housing; and pressing the cover against the housing to effect termination of the cable and final assembly of the cover and housing.

2. A method according to claim 1 assuring dispensing of but a single unit from a gravity discharge magazine to said preassembly station further comprising the steps of:

dispensing the bottom unit from said magazine, grasping the next unit in the magazine and elevating said next unit and the magazine from the dispensed bottom unit, removing the dispensed bottom unit to a work station, and lowering said next unit and the magazine while releasing said next unit for dispensing.

3. An apparatus for preassembling components in a first station, transporting and finally assembling them in a second station comprising:

means for dispensing first and second units in said first station;

means for aligning said units for preassembly;

means for assembling said units into a single preassembly;

transport means adapted to receive said preassembled units and move and align them for final assembly in said second station; and means for effecting final assembly of said preassembled units at said second station.

4. An apparatus for preassembling a cover on a housing which has been preloaded with a plurality of terminals and terminating a multi-conductor flat cable by fully applying the preassembled cover to the housing, said apparatus comprising:

first and second means to dispense said cover and said housing, respectively, at a preassembly station;

ram means to drive said housing against said cover into a preassembled condition;

means to transport said preassembled cover and housing to a terminating station; and press means to fully apply said cover to said housing while terminating conductors of a cable inserted therebetween.

5. An apparatus according to claim 4 wherein said first and second means to dispense said cover and said housing further comprises means to reorient one of said cover and said housing with respect to the other.

6. An apparatus according to claim 4 wherein said first and second means to dispense said cover and said housing further comprises:

first and second magazines for said covers and said housings, respectively;

means to assure dispensing of but a single cover and housing in said preassembly station including means adapted to grasp the next lowermost cover and housing and raise them and their respective magazines from the cover and housing dispensed into the preassembly station.

7. An apparatus according to claim 4 wherein said ram means is adapted to drive said preassembled cover and housing into said transport means.

8. An apparatus according to claim 4 wherein said transport means is adapted to reorient said preassembled cover and housing during movement to said terminating station.

9. An apparatus according to claim 4 wherein said transport means further comprises:

a cam plate having thereon a first cam track controlling movement of said ram means, a second cam track controlling said first and said second dispensing means, and a third cam track controlling orientation of said transport means.

* * * * *